United States Patent
Cain et al.

(10) Patent No.: US 10,560,728 B2
(45) Date of Patent: Feb. 11, 2020

(54) SYSTEMS AND METHODS FOR STITCHING SEPARATELY ENCODED NAL UNITS INTO A STREAM

(71) Applicant: Triton US VP Acquisition Company, Costa Mesa, CA (US)

(72) Inventors: Harel Cain, Jerusalem (IL); Michal Devir, Haifa (IL); Gitty Zinger, Jerusalem (IL); David Atias, Maale Adumim (IL)

(73) Assignee: TRITON US VP ACQUISITION CO., Costa Mesa, CA (US)

( * ) Notice: Subject to any disclaimer, the term of this patent is extended or adjusted under 35 U.S.C. 154(b) by 61 days.

(21) Appl. No.: 15/607,542

(22) Filed: May 29, 2017

(65) Prior Publication Data

US 2018/0343478 A1    Nov. 29, 2018

(51) Int. Cl.
| | |
|---|---|
| H04N 21/8358 | (2011.01) |
| H04N 21/258 | (2011.01) |
| H04N 21/435 | (2011.01) |
| H04N 21/44 | (2011.01) |
| H04N 21/2343 | (2011.01) |
| H04N 21/236 | (2011.01) |
| H04N 21/234 | (2011.01) |
| H04N 21/434 | (2011.01) |

(52) U.S. Cl.
CPC ........ *H04N 21/234345* (2013.01); *H04N 21/23424* (2013.01); *H04N 21/23608* (2013.01); *H04N 21/4345* (2013.01)

(58) Field of Classification Search
None
See application file for complete search history.

(56) References Cited

U.S. PATENT DOCUMENTS

| | | |
|---|---|---|
| 7,738,676 B1 | 6/2010 | Evans et al. |
| 8,462,982 B2 | 6/2013 | Colaitis et al. |
| | (Continued) | |

FOREIGN PATENT DOCUMENTS

| | | |
|---|---|---|
| EP | 1605703 A1 | 12/2005 |
| WO | 2005053301 A2 | 6/2005 |

OTHER PUBLICATIONS

"International Search Report and Written Opinion Issued in PCT/US2018/034448", dated Jul. 25, 2018, 15 pages.

(Continued)

*Primary Examiner* — Alison Slater
(74) *Attorney, Agent, or Firm* — Merchant & Gould P.C.

(57) ABSTRACT

In one embodiment, a method comprising obtaining a stream comprising first network abstraction layer (NAL) units generated in a first encoding, the first NAL units including first slices, obtaining second NAL units generated in a second encoding, the second NAL including second slice(s), and stitching the second NAL units into the stream, the stitching including positioning the second slice(s) in respective position(s) in the stream formerly occupied by temporary slice(s) generated in the first encoding, and for the second slice(s) conforming at least one slice header syntax element and at least one network abstraction layer unit syntax element of a second slice to values of a temporary slice formerly occupying the position of the second slice, and retaining at least one other slice header syntax element of the second slice as encoded in the second encoding.

20 Claims, 6 Drawing Sheets

(56) References Cited

U.S. PATENT DOCUMENTS

| | | | |
|---|---|---|---|
| 8,995,711 | B2 | 3/2015 | Thorwirth |
| 9,031,135 | B2 | 5/2015 | Zhu |
| 9,299,120 | B2 | 3/2016 | Zou et al. |
| 2009/0219987 | A1* | 9/2009 | Base ............... H04N 21/23892 375/240.01 |
| 2011/0129116 | A1* | 6/2011 | Thorwirth ........... H04N 19/467 382/100 |
| 2012/0224641 | A1* | 9/2012 | Haberman ........... H04N 19/513 375/240.24 |
| 2015/0020095 | A1 | 1/2015 | Yoo et al. |
| 2018/0302690 | A1* | 10/2018 | Tran .................. H04N 21/8358 |

OTHER PUBLICATIONS

ITU-T H.264 Telecommunication Standardization Sector of ITU (Feb. 2016) Series H: Audiovisual and Multimedia Systems Infrastructure of audiovisual services—Coding of moving video.
Content Armor: Forensic Video Watermarking. Copyright 2016.
Dekun Zou, et al.; H.264/AVC Substitution Watermaking: A CAVLC Example; 2009.
Gianluca Gennari et al.; "Slice header reconstruction for H.264/AVC robust decoders," 2005 IEEE 7th Workshop on Multimedia Signal Processing, Shanghai, 2005, pp. 1-4, doi: 10.1109/MMSP.2005.248605.
J. Stankowski, et al.; "Fast watermarking of MPEG-4 AVC/H.264 encoded HDTV video bitstreams," 2012 Picture Coding Symposium, Krakow, 2012, pp. 265-268.
K. Yen, et al.; "A joint source-channel decoder for H.264 SPS and PPS headers," The 15th International Symposium on Wireless Personal Multimedia Communications, Taipei, 2012, pp. 443-447.

* cited by examiner

SYSTEMS AND METHODS FOR STITCHING SEPARATELY ENCODED NAL UNITS INTO A STREAM

TECHNICAL FIELD

The present disclosure generally relates to video encoding.

BACKGROUND

The H.264 video standard was developed in response to a growing need for higher compression of video for various applications such as videoconferencing, digital storage media, television broadcasting, internet streaming and communication.

Examples of types of proprietary encoders implementing the H.264 video standard include: QuickTime®, Nero Digital™, TotalCode®, ProCoder,®, Intel® Quick Sync Video, Advanced Micro Devices (AMD) Video Coding Engine, Nvidia Encoder (NVENC), etc. Examples of types of free encoders implementing the H.264 video standard include: x264, openH264, etc.

Other video standards include H.262, H.265, etc. Similarly to the H.264 video standard, each of the other video standards may be implemented by any of a plurality of types of encoders.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided, in accordance with some embodiments of the presently disclosed subject matter, a method comprising obtaining a stream comprising first network abstraction layer units generated in a first encoding, the first network abstraction layer units including first slices, obtaining second network abstraction layer units generated in a second encoding, the second network abstraction units including one or more second slices, and stitching the second network abstract layer units into the stream, the stitching including positioning the one or more second slices in one or more respective positions in the stream formerly occupied by one or more temporary slices generated in the first encoding, and for the one or more second slices conforming at least one slice header syntax element and at least one network abstraction layer unit syntax element of a second slice to values of a temporary slice formerly occupying the position of the second slice, and retaining at least one other slice header syntax element of the second slice as encoded in the second encoding.

EXAMPLE EMBODIMENTS

Figure 1A:
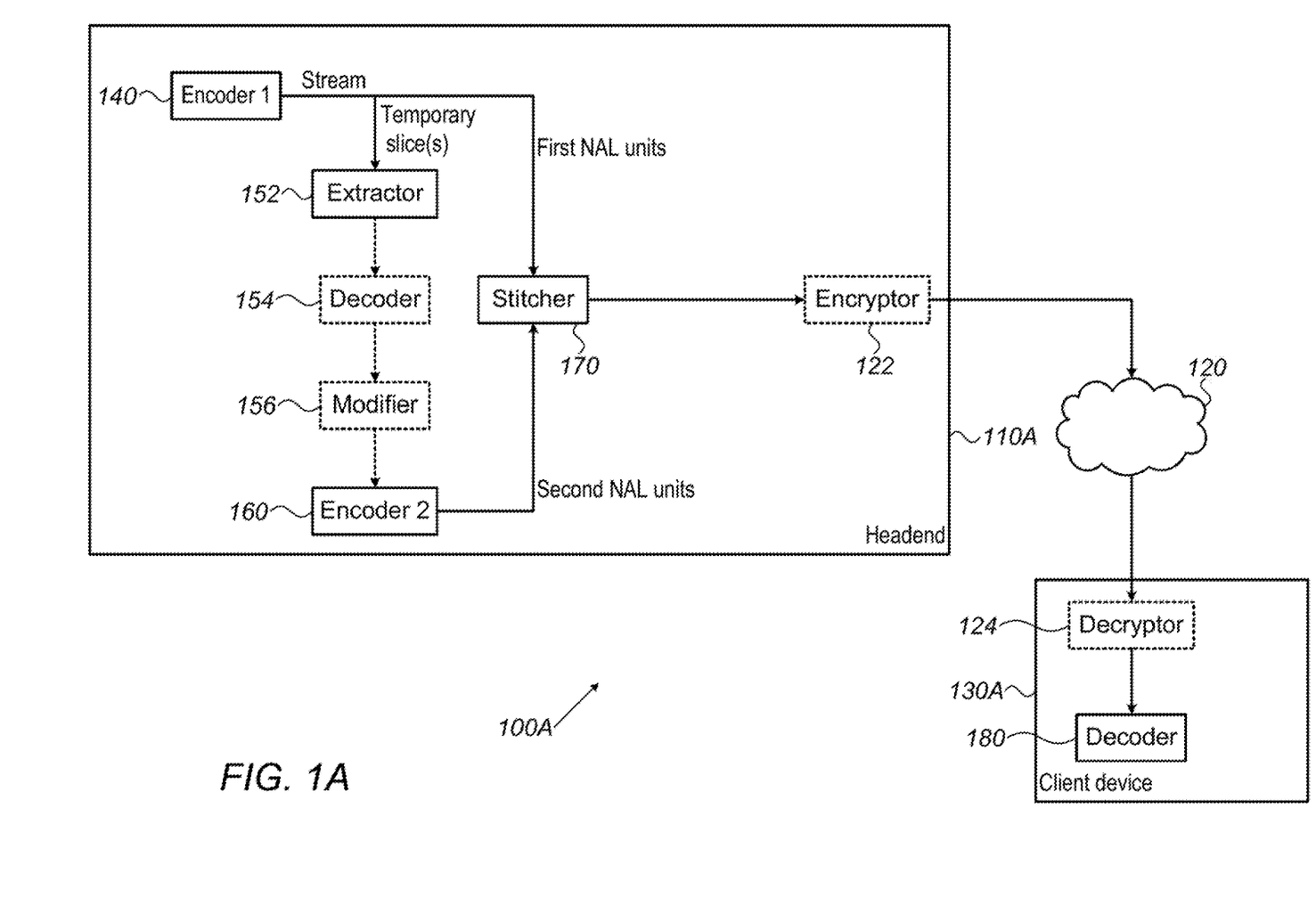
FIG. 1A is a simplified block diagram of a system, in accordance with some embodiments of the presently disclosed subject matter.
Figure 1B:
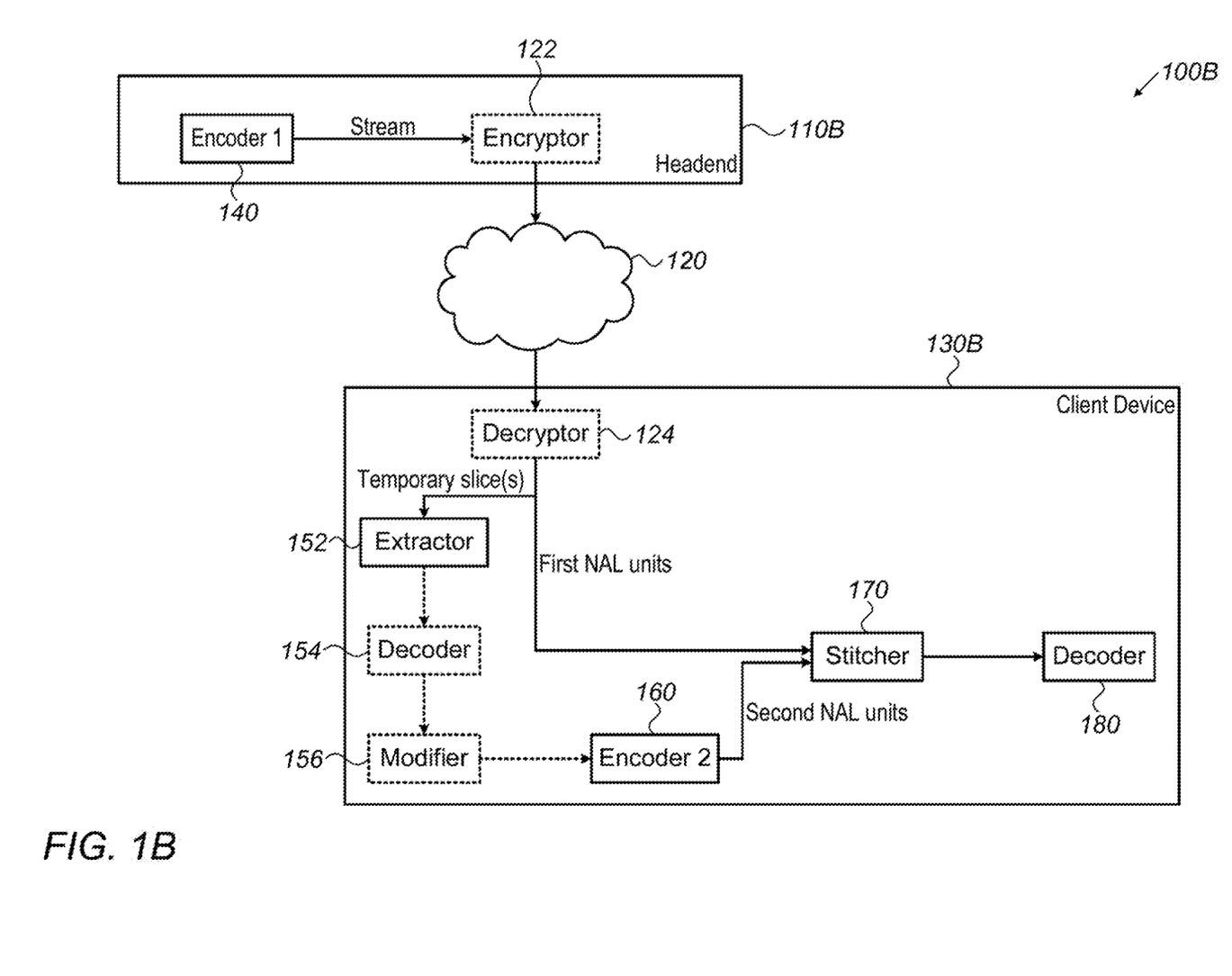
FIG. 1B is another simplified block diagram of a system, in accordance with some embodiments of the presently disclosed subject matter.

Reference is now made to FIG. 1A and FIG. 1B which are simplified block diagram of systems 100A and 100B, respectively, in accordance with some embodiments of the presently disclosed subject matter.

As illustrated in FIG. 1A, system 100A includes a headend 110A, a network 120, and a client device 130A. Headend 110A includes a first encoder 140 adapted to perform a first encoding, the first encoding generating a stream including first Network Abstraction Layer (NAL) units and certain slice(s) (referred to herein as temporary slice(s)). Headend 110A further includes an extractor 152 adapted to extract the temporary slice(s) from the stream. Headend 110A further includes a second encoder 160 adapted to perform a second encoding, the second encoding generating second NAL units including second slice(s). Headend 110A further includes a stitcher 170 adapted to stitch the second NAL units into the stream, including positioning the second slice(s) in the position(s) formerly occupied by the temporary slice(s) (meaning the position(s) occupied by the temporary slice(s) prior to extraction of the temporary slice(s) from the stream). Optionally, as illustrated by the dotted boxes, headend 110A includes a decoder 154, and/or a modifier 158. For example, decoder 154 may be adapted to decode the extracted temporary slice(s). Modifier 156 may be adapted to modify the decoded slice(s), when appropriate in this example. The decoded slice(s) or modified version(s) thereof, in this example, may be encoded by second encoder 160 in the second encoding, yielding at least part of the second NAL unit(s).

As further illustrated in FIG. 1A, client device 130A includes a decoder 180 which is adapted to decode the stream, after the stitching has taken place. Once the stream is decoded into decoded video, the decoded video may, for example, be displayed on a display embedded in or operatively coupled to client device 130A.

For example, headend 110A may be adapted, after the stitching has taken place, to send the stream, or an encrypted version thereof, via network 120 to client device 130A. Client device 130A may be adapted to receive the stream, or an encrypted version thereof. If the stream is sent encrypted, headend 110A (e.g. an optional encryptor 122 at headend 110A) may be adapted to encrypt the stream as is known in the art prior to sending. In this case, client device 130A (e.g. an optional decryptor 124 at client device 130A) may be adapted to decrypt the encrypted version of the stream, thereby recovering the stream which may then be decoded.

As illustrated in FIG. 1B, system 100B, includes a headend 110B, network 120, and a client device 130B. Headend 110B includes first encoder 140 adapted to perform the first encoding, the first encoding generating a stream including first NAL units and temporary slice(s). Headend 110B is adapted to send the stream, or an encrypted version thereof, via network 120 to client device 130B. Client device 130B is adapted to receive the stream, or an encrypted version thereof. If the stream is sent encrypted, headend 110B (e.g. optional encryptor 122 at headend 110B) may be adapted to encrypt the stream as is known in the art prior to sending. In this case, client device 130B (e.g. optional decryptor 124 at client device 130B) may be adapted to decrypt the encrypted version of the stream, thereby recovering the stream.

As further illustrated in FIG. 1B, client device 130B includes an extractor 152 adapted to extract the temporary slice(s) from the stream. Client device 130B further includes second encoder 160 adapted to perform the second encoding. The second encoding generates second NAL units. Client device 130B further includes stitcher 170 adapted to stitch the second NAL units into the stream, including positioning the second slice(s) in the position(s) formerly occupied by the temporary slice(s). Optionally, client device 130B includes decoder 154, and/or modifier 156. For example, decoder 154 may be adapted to decode the temporary slice(s) Modifier 156 may be adapted to modify the decoded slice(s), when appropriate in this example. The decoded slice(s) or modified version(s) thereof, in this example, may be encoded by second encoder 160 in the second encoding, yielding at least part of the second NAL unit(s).

As further illustrated in FIG. 1B, client device 130B includes decoder 180 which is adapted to decode the stream, after the stitching has taken place. Once the stream is decoded into decoded video, the decoded video may, for example, be displayed on a display embedded in or operatively coupled to client device 130B.

In some other embodiments, one or more of the elements shown in FIGS. 1A and/or 1B as being in headend 110A, headend 110B, client device 130A and/or client device 130B may be located in network 120. For example, stitcher 170 may be located in network 120, and in this example the stream, after stitching, may be transferred to client device 130A via a part of network 120 that is between stitcher 170 and client device 130A. Additionally or alternatively, if encryption is desired between a headend (e.g. 110A, 110B) and a client device (e.g. 130A, 130B), and element(s) of a system in accordance with the subject matter are included in network 120, such a system may in some cases include additional encryptor/decryptor(s), in addition to encryptor 122 and decryptor 124 that are shown in FIGS. 1A and 1B. Additionally or alternatively, there may be a different division of elements among the headend and the client device than shown in FIG. 1A or FIG. 1B. For example, encoder 140, encoder 160, and extractor 152 (and optional decoder 154 and modifier 156) may be in the headend, while stitcher 170 may be in the client device. In this example, the first and second NAL units are optionally encrypted and decrypted before and after the transfer of the first and second NAL units to the client device.

The second encoding by second encoder 160 is performed separately from the first encoding by first encoder 140, meaning that the second encoding is not performed as part of the first encoding nor vice versa. Both the first encoding by first encoder 140 and the second encoding by second encoder 160 are implemented in accordance with a particular video standard such as the H.264 or H.265 video standard. However, first encoder 140 and second encoder 160 may or may not be the same actual encoder or the same type of encoder. For example, first encoder 140 and second encoder 160 may be the same actual free or proprietary encoder, may be the same type of free or proprietary encoder, or may be different types of encoders. Some examples of proprietary and free encoders were provided in the background section of this disclosure.

For the sake of illustration, it is assumed that specific input is inputted into second encoder 160. Even if second encoder 160 and first encoder 140 are the same type of encoder, or even the same actual encoder, because the second encoding by second encoder 160 is performed separately from the first encoding by first encoder 140, the generated second NAL units for the specific input may not necessarily be identical to NAL units for the specific input which would have been generated in a first encoding of the specific input. For example, the generated second NAL units may not necessarily be identical to the NAL units for the specific input that would have been generated had the specific input been part of a larger input into first encoder 140 and been encoded as part of the encoding of the larger input. In another example, the generated second NAL units may not necessarily be identical to the NAL units for the specific units that would have been generated had the input into first encoder 140 included the specific input but been otherwise different from the input into second encoder 160 (e.g. because one of the inputs also includes other input besides the specific input, because the inputs also include different inputs, etc.).

Moreover, if encoder 140 and 160 are different types of encoders implementing a particular video standard, the second NAL units generated in the encoding of specific input by second encoder 160 may not necessarily be identical to NAL units that would have been generated in an encoding of the specific input by first encoder 140, even if the input into both encoders 140 and 160 were identical.

Regardless of whether first and second encoders 140 and 160 are the same actual encoder/same type of encoder or not the same type of encoder, applying a second encoding that may be agnostic to the characteristics of first encoder 140, as allowed for by some embodiments of the subject matter, reduces the burden of determining a-priori whether or not the second encoding by second encoder 160 would generate the same NAL units as would have been generated in a first encoding, and allows for an approach that may be implemented systematically. In other embodiments, the second encoding may take into account characteristics of first encoder 140. Irrespective of whether or not the second encoding is agnostic to the characteristics of first encoder 140, the second NAL units generated in the second encoding by second encoder 160 are stitched into a stream generated in a first encoding by first encoder 140. As will be described in more detail below, the stitching is non-trivial, so that the stream may be properly decoded.

NAL units that are generated in accordance with subject matter (e.g. first NAL units, second NAL units, temporary slices, etc.) may be organized in accordance with a particular video standard (e.g. the H.264 video standard, H.265 video standard, etc.) that is being applied. Generated NAL units may include, for example, slices, Picture Parameter Set(s) (PPS(s)), Sequence Parameter Set(s) (SPS(s)), etc. As is known in the art, a slice (also referred to as a slice segment) includes block(s) (e.g. macroblocks, coding tree unit(s), etc.). In various cases of the subject matter, a particular slice may include a single block, an entire frame may be encoded as the particular slice, or the particular slice may include more than one block but less than an entire frame. As is also known in the art, slices are categorized into various types based on prediction. A certain slice in accordance with the subject matter may be categorized as a B slice, a P slice, an I slice (also referred to as intra-slice), an SI slice, an SP slice, or any other type of slice. A stream in accordance with the subject matter may, for example, be a bitstream (e.g. as defined by the H.264 video standard), such as an NAL unit stream or a byte stream. The stream may conform to a particular video standard (e.g. H.264 video standard, H.265 video standard, etc.) that is being applied, or may not necessarily conform to the video standard that is being applied as long as any differences from the applied video standard do not cause non-trivial decoding errors.

The stitching described herein may be applied to NAL units that conform to one or more profiles of the applied video standard (where a profile may be a specified subset of the syntax of a video standard). For example, the stitching described herein may at least be relevant when the NAL units conform to the Main and/or High profiles which are the most common profiles used in the television industry.

Figure 2:
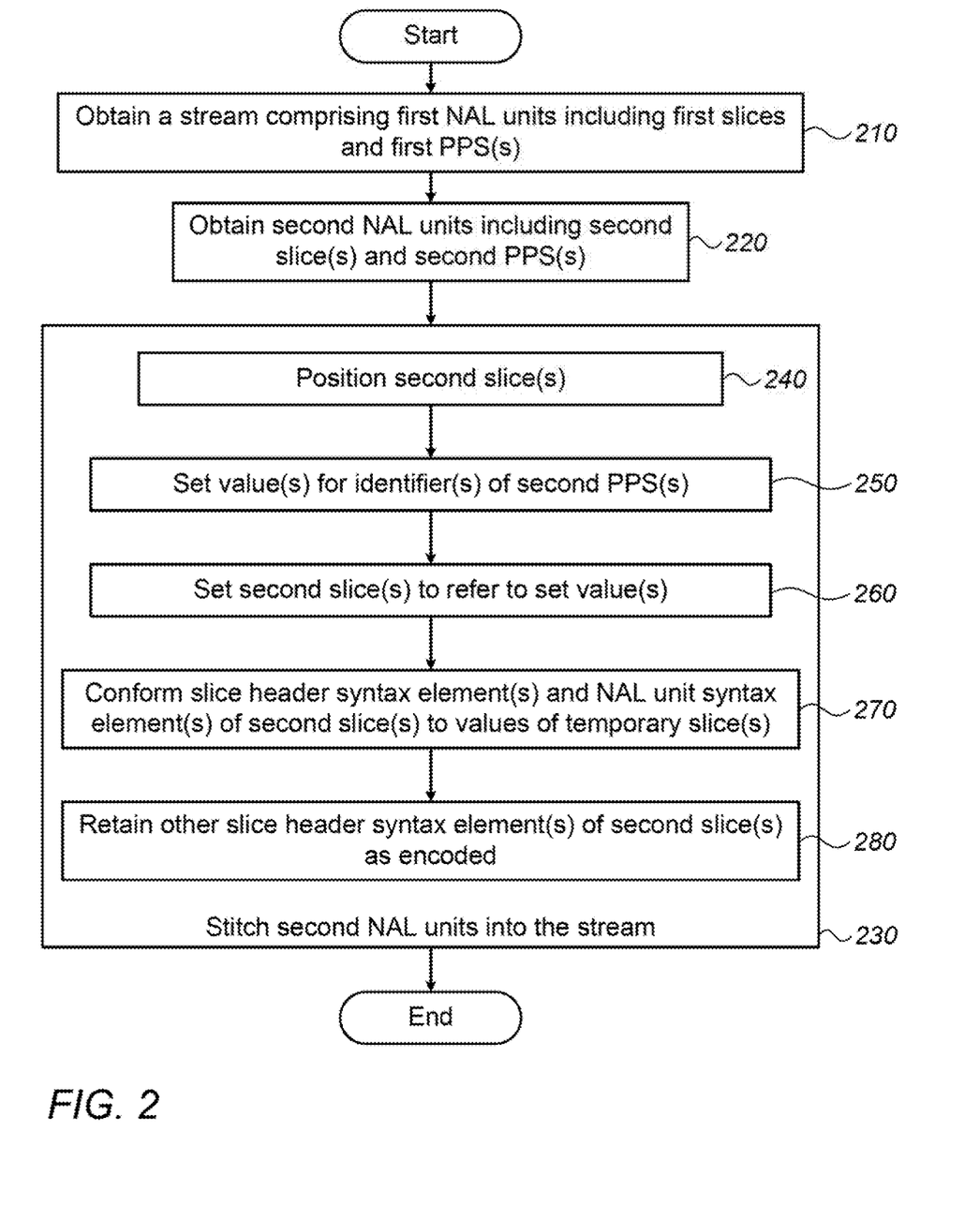
FIG. 2 is a flowchart of a method, in accordance with some embodiments of the presently disclosed subject matter.

FIG. 2 is a flowchart of a method 200, in accordance with some embodiments of the presently disclosed subject matter.

In stage 210, a stream is obtained, for example by stitcher 170. The stream may be obtained, for instance, in a headend (e.g. headend 110A), in a client device (e.g. client device 130B), or in a network between a headend and a client device (e.g. network 120).

The obtained stream includes first NAL units generated in a first encoding (e.g. by first encoder 140). The first NAL units include first slices and optionally one or more first PPSs. It is noted that if there is more than one first PPS in the stream, the first PPSs may or may not all be identical.

The stream that is obtained in stage 210 may, for example, also include temporary slice(s) generated in the first encoding. The temporary slice(s) may be extracted from the stream (e.g. by extractor 152) at any time prior to positioning the second slice(s) (see below stage 240). For instance, if in this example there is a plurality of temporary slices, each temporary slice may be extracted and the remainder of method 200 (optionally including method 300) may be performed for the second slice(s) that will occupy the former position of the temporary slice, before another temporary slice is extracted; or more than one (or even all) of the temporary slices may be extracted and then the remainder of method 200 (optionally including method 300) may be performed for the second slices that will occupy the former positions of the temporary slices. In another example, the stream that is obtained in stage 210 may exclude the temporary slice(s) if the temporary slice(s) were previously extracted (e.g. by extractor 152) from the stream.

Notwithstanding the extraction of temporary slice(s) (e.g. before or after the stream is obtained in stage 210), at least the values of the temporary slice(s) that are to be used during the stitching (see description of stage 270 of FIG. 2 below), may be retained, so that the values may be obtained by stitcher 170 when needed. Alternatively, such values may not necessarily be retained, if for instance, the value(s) may be replicated, e.g. when needed by stitcher 170.

In some instances, a decision may be made (e.g. by extractor 152 and/or decoder 154) whether to extract a specific slice (which is consequently considered for the purposes of the description to be a temporary slice), or to not extract the specific slice (which is consequently considered to be a first slice for the purposes of the description). The decision may be based on any one or more appropriate criteria. For example, appropriate criterion/criteria may include position and/or content. Referring for simplicity's sake to an example where no reslicing takes place (see discussion below), the slice may be extracted if the slice were at a selected position, and/or included suitable content. In order to determine whether or not the content of the slice is suitable, the slice may be copied and the copied slice may be decoded (e.g. by decoder 154). Ignoring any other criterion that may be relevant to this example, if from the decoding the content is determined to be suitable, the slice may be extracted. If the content is determined to not be suitable, the slice may remain in the stream.

Temporary slice(s) may be extracted, in some cases, from selected position(s) in the stream. For example, if watermarking (e.g. forensic and/or non-forensic) is to be performed at headend 100A, at least part of the temporary slice(s) may be extracted from selected position(s) constituting duplication point(s), so that multiple versions of the watermark may be substituted at each of such points, as will be described in more detail below. Additionally or alternatively, extraction may include reslicing a certain slice (referred to as the original complete slice) in the stream into at least two temporary slices which are extracted. In an example where extraction includes reslicing, because the at least two temporary slices are part of the original complete slice, the at least two temporary slices may be considered to have been in the stream and to have been extracted, even though the reslicing may occur after extraction of the original complete slice from the stream. It is noted that reslicing may not necessarily be performed. For instance it may be desirable not to reslice and thus maintain the same number of slices in the stream, after the stitching, per destination client device (e.g. per client device 130A and any other client device(s) receiving the stream), as were in the stream prior to extraction. In this instance, it is assumed that if there is a plurality of second slices at any one duplication point, such second slices are counted once per client device.

In stage 220, which may occur before, after, or simultaneously to stage 210, second NAL units are obtained, for example by stitcher 170. The second NAL units were generated in a second encoding (e.g. by second encoder 160). The second encoding and first encoding were performed separately. The second NAL units include at least one second slice and optionally at least one second PPS. If more than one second PPS is included, the second PPS s may or may not be identical. The second NAL units may be obtained in a headend (e.g. headend 110A) in a client device (e.g. client device 130B), or in a network between a headend and a client device (e.g. network 120).

With respect to stages 210 and 220, there may not necessarily be a one to one correspondence between the number of first or second NAL units that include first or second slices, respectively, and the number of first or second slices. A single NAL unit may include a slice or a plurality of NAL units may include a slice, with each of the plurality comprising a slice data partition of the slice.

Figure 3:
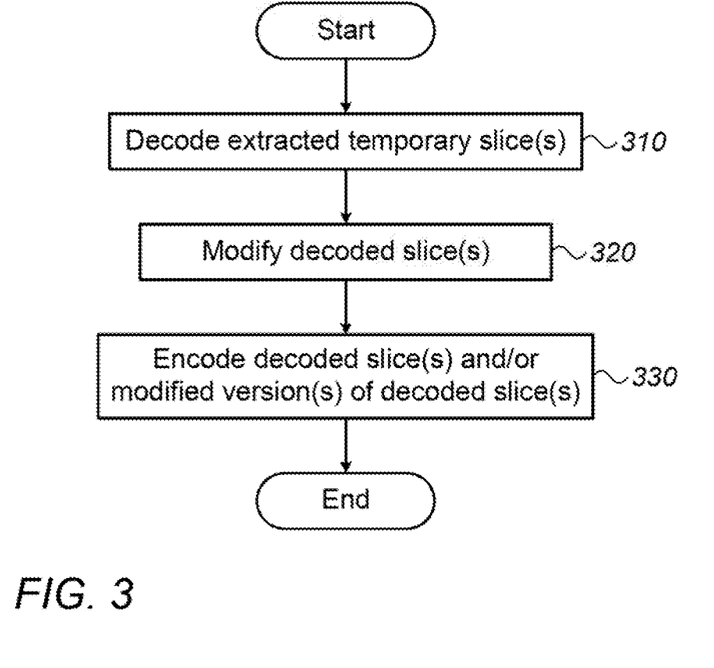
FIG. 3 is another flowchart of a method, in accordance with some embodiments of the presently disclosed subject matter.

In some examples, one or more of the second NAL units referred to in stage 220 may be derived from certain NAL unit(s) (e.g. temporary slice(s)) that were extracted from the stream. Reference is now made to FIG. 3 which is a flowchart of a method 300, in accordance with some embodiments of the presently disclosed subject matter. Method 300 may be performed at any appropriate time prior to stage 220 of FIG. 2.

In stage 310, extracted temporary slice(s) are decoded (e.g. by decoder 154). The decoding may reverse the encoding performed in the first encoding.

In optional stage 320, the decoded slice(s) may be modified (e.g. by modifier 156). Any suitable modification(s) may be performed such as any of forensic watermarking, non-forensic watermarking, logo insertion, blurring (e.g. of minors), video downgrading, linear ad insertion, pixelating, advertisement object planting, changing coloring, etc. It is noted that if a plurality of decoded slices is being modified, the same type(s) of modification(s) is not necessarily performed on all of the decoded slices. For example, on certain decoded slice(s) forensic watermarking and/or pixelating may be performed; and on certain other decoded slice(s), logo insertion and pixelating may be performed.

In some cases where stage 320 is performed, modifying may be performed once for a particular temporary slice (e.g. once on the decoded particular temporary slice that was generated by decoding the particular temporary slice), the modifying yielding one modified version for the particular slice. In some other cases where stage 320 is performed, modifying may be performed a plurality of times for a particular temporary slice (e.g. performed a plurality of times on the decoded particular temporary slice that was generated by decoding the particular temporary slice), the modifying yielding a plurality of modified versions for the particular slice. For example, if the modifying is performed at headend 110A or network 120, and the modification(s) (e.g. watermarks, advertisements etc.) is to be tailored to the destination client devices (e.g. tailored to client device 130A and other client devices receiving the stream), the modifying may be performed a plurality of times. In such cases where modifying is performed a plurality of times for a particular temporary slice, it may be advantageous for a particular temporary slice to have been resliced from an original complete slice that was included in the stream, so that the modified versions for the particular temporary slice may represent a smaller part of the stream, after stitching, than would have been the case without reslicing, and thus save on the bandwidth required for transferring the stream.

Stage 320 may be omitted, if no modifying is required. If there is a plurality of temporary slices, stage 320 may be performed for all of the temporary slices, for part of the temporary slices, or for none of the temporary slices. For example, the temporary slice(s) may be decoded in order to inspect the temporary slice(s), and if subsequent to the inspection there is no need to modify the temporary slice(s), stage 330 may be omitted. As another example, if extraction included reslicing of an original complete slice, then modification may not necessarily be performed for all of the temporary slices resulting from the reslicing.

In stage 330, for each of the decoded slice(s), the decoded slice or modified version(s) of the decoded slice are encoded in a second encoding (e.g. by second encoder 160). In some cases of stage 330, if there is a plurality of decoded slices, one or more of the decoded slices may be encoded, and modified version(s) of one or more other decoded slices may be encoded, in the second encoding. In some other cases of stage 330, if there is a plurality of decoded slices, then either all of the decoded slices or modified versions of all of the decoded slices are encoded in the second encoding. The second encoding in stage 330 may, for instance, yield all of the second slice(s) obtained in stage 220 of FIG. 2.

As illustrated in FIG. 3, method 300 then ends. In some cases, method 300 may include, fewer, more and/or different stages than illustrated in FIG. 3.

In some examples, all of the second slice(s) obtained in stage 220 derive from NAL unit(s) extracted from the stream, e.g. as described in method 300.

In some other examples, method 300 is not performed, and none of the second slice(s) obtained in stage 220 derives from NAL unit(s) extracted from the stream. In these examples, the input that was encoded in the second encoding (e.g. by second encoder 160) to generate the second NAL units (including the second slice(s)) obtained in stage 220 may have been any appropriate input, e.g. originating in headend 110A or 110B, network 120, client device 130A or 130B, etc.

In still further examples, at least one of the second slice(s) obtained in stage 220 is derived from NAL unit(s) extracted from the stream, e.g. as described in method 300. However, in these examples, one or more other of the second slice(s) obtained in stage 220 do not derive from any NAL units extracted from the stream.

Continuing with the description of method 200 (FIG. 2), in stage 230, the second NAL units are stitched (e.g. by stitcher 170) into the stream.

In some cases, the second slice(s), included in the second NAL units, are slice(s) that may be decoded using prediction from decoded samples within the same slice (e.g. I-slice, SI slice, etc.). Use of such slice(s) may be advantageous in that the encoding of such slice(s) may be simpler than the encoding of other type(s) of slices, and the impact that removal of such slice(s) from the stream (e.g. by an attacker) on the eventual decoding of the stream may be larger than for other type(s) of second slice(s) and thus easier to detect. Furthermore if a given second slice includes modification(s) applied, for example by way of method 300, the impact of the modification(s) on the eventual decoding of other slice(s) (e.g. first slices or other second slice(s)) in the stream may be advantageously larger than if the given second slice(s) were another type of slice. For instance, if the modification(s) included a watermark (e.g. forensic or non-forensic), then during decoding the watermark may drift into subsequent slices. However, in some other cases, the second slice(s) may include any type(s) of slice(s), suitable for the methods described herein.

Stage 230 may, for instance, include the following stages 240, 250, 260, 270 and 280 that will now be described.

In stage 240, the second slice(s) are positioned in the respective position(s) in the stream formerly occupied by temporary slice(s). For example, a particular temporary slice may have occupied a particular position in the stream, prior to extraction. A second slice (or a plurality of second slices) may be positioned in stage 240 in the particular position in the stream, effectively replacing the particular temporary slice.

In optional stage 250, upon determining that at least one of the identifier(s) used to identify any of the second PPS(s) included in the second NAL units, is identical to at least one of the identifier(s) used to identify any of the first PPS(s) included in the first NAL units, the at least one identifier used to identify any of the second PPS(s) may be set to have value(s) different from any identifier used to identify the first PPS(s).

For example, identifier(s) of the second PPS(s) (from the second encoding) may be set to have value(s) different from any other identifier used to identify the first PPS(s). Additionally or alternatively, identifier(s) of the second PPS(s) (from the second encoding) may be confirmed as being different from any other identifier used to identify the first PPS(s), and stage 250 may be omitted for such confirmed different identifier(s). If there is a plurality of identifiers for the second PPS(s), all identifiers may be set, all identifiers may be confirmed, or one or more identifiers may be set and one or more other identifiers confirmed. In some cases, one identifier may be used for the second PPS(s). In such cases, if a plurality of second PPSs are generated during the second encoding, e.g. due to multiple invocations of second encoder 160, the addition of each second PPS to the stream may overwrite any second PPS previously added to the stream, or no other second PPS(s) may be added to the stream after the first one was added to the stream. In these cases, the stream may therefore include one second PPS.

The identifier(s) used to identify the second PPS(s) resulted from the second encoding, whereas the identifier(s) used to identify the first PPS(s) resulted from the first encoding. It is noted that a first PPS may not necessarily be identical to a second PPS, and therefore it would not be desirable for the two PPSs to be identified by the same identifier. However, because the first encoding and second encoding are performed separately, in some cases the PPSs generated in the two encodings may be identified by the same identifiers. Optionally, identifier(s) of the second PPS(s) are set to or confirmed as having values that would not be expected to have been used as identifier(s) for the first PPS(s) in the first encoding even if the first encoding resulted in first PPSs that are not all identical. For instance, values not expected to have been used as identifier(s) for the first PPS(s) may include high values.

In section 7.3.2.2.2 of the H.264 video standard, syntax elements of a PPS Raw Bite Sequence Payload (RBSP) syntax are defined. The pic_parameter_set_id syntax element specifies the identifier of the PPS. This syntax element for any second PPS, for instance, may be set to or confirmed as being an identifier that is different from any other identifier specified in the corresponding syntax element of any first PPS. The remainder of the syntax elements of the PPS (other than the seq_parameter_set_id which will be discussed below) are typically although not necessarily retained for the first PPS(s) and the second PPS(s), as encoded in the first encoding and second encoding respectively. For example, at least the syntax elements: entropy_coding_mode_flag, pic_init_qp_minus26, pic_init_qs_minus26, constrained_intra_pred_flag, num_slice_groups_minus1, chroma_qp_index_offset, deblocking_filter_control_present_flag and redundant_pic_cnt_present_flag may be retained. At least the following syntax elements may be retained if present: transform_8×8_mode_flag, pic_scaling_matrix_present_flag and pic_scaling_list_present_flag[i]. It is noted that for first and second PPSs, the entropy coding flag is typically although not necessarily equal to 1, denoting Context-adaptive binary arithmetic coding (CABAC). In some cases, the first and second encodings may have ensured that the syntax element pic_init_qp_minus26 for the first and second PPSs are appropriate. For example, it may be appropriate that the pic_init_qp_minus26 for a second PPS be approximately equal to the pic_init_qp_minus26 for a first PPS. The num_slice_groups_minus1 and redundant_pic_cnt_present_flag may be zero for certain profiles.

In examples where the first and second encodings implemented the H.265 video standard, appropriate syntax element(s) of the second PPS(s) may be set to, or confirmed as being, identifier(s) that are different from identifier(s) used in corresponding syntax element(s) of first PPS(s), and appropriate syntax element(s) may be retained for the first PPS(s) and second PPS(s) as encoded in the first encoding and second encoding respectively.

In some embodiments, stage 250 may be omitted. For example, if the first and second encodings resulted in distinct identifiers for the first and second PPSs, then stage 250 may be omitted. Continuing with describing this example, second encoder 160 may in some cases be adapted to necessarily generate identifier(s) for second PPS(s) distinct from the identifier(s) of the first PPS(s), such as identifier(s) having value(s) not expected to have been used for identifier(s) of the first PPS(s).

In optional stage 260, upon determining that at least one of the identifier(s) used to identify any of the second PPS(s), is identical to at least one of the identifier(s) used to identify any of first PPS(s) (as in stage 250), setting any of the second slice(s) which referred to an identifier of a second PPS that was determined to be identical to any identifier of a first PPS, to refer instead to the different value that was set in stage 250 for the identifier of the second PPS. For instance, if a given second slice referred to identifier "0" which was used to identify certain second PPS(s) and also certain first PPS(s), and in stage 250 the identifier of the certain second PPS(s) was set to have a value of "188" (assumed to be different from any identifier used to identify first PPS(s)), then the given second slice may be set in stage 260 to refer to identifier "188" instead.

Second slice(s) may be set in stage 260, for example, to refer to different value(s) set in stage 250. Additionally or alternatively second slice(s) may be confirmed as referring to identifier(s) of second PPS(s) different from any identifier(s) of the first PPS(s) and stage 260 may be omitted for such second slice(s). If there is a plurality of second slices all second slices may be set to refer to different value(s) set in stage 250; all second slices may be confirmed as referring to identifier(s) of second PPS(s) different from any identifier(s) of the first PPS(s); or one or more second slices may be set to refer to different value(s) set in stage 250, and one or more other second slices may be confirmed as referring to identifier(s) of second PPS(s) different from any identifier(s) of the first PPS(s).

It is noted that if there is one identifier used for the second PPS(s), then each slice refers to this identifier. If there are various identifiers for various second PPSs, then a given second slice refers to the identifier for the particular second PPS that applies to the given slice. As is known in the art, a particular PPS may apply to zero or more slices.

Section 7.3.3 of the H.264 video standard includes the slice header syntax. The syntax element pic_parameter_set_id in the slice header of a given second slice, for example, may be set to refer to the different value that was set in stage 250 for the second PPS that applies to the given slice. Additionally or alternatively, the syntax element pic_parameter_set_id in the slice header of the given second slice may be confirmed as referring to an identifier of the second PPS that applies to the given slice that is different from any identifier(s) of the first PPS(s). If there is more than one second PPS, the identifier of the second PPS that applies to the given slice may or may not be a common identifier for all of the second PPSs. Similarly, for an H.265 implementation, an appropriate syntax element in the slice header of a given second slice may be set to refer to the different value that was set in stage 250 for the second PPS that applies to the given slice, or may be confirmed as referring to an identifier of the second PPS that applies to the given slice that is different from any identifier(s) of the first PPS(s).

In some embodiments, stage 260 may be omitted. For example, if the first and second encodings resulted in distinct identifiers for the first and second PPSs, and resulted in the second slice(s) referring to such identifier(s) of the second PPS(s), then stage 260 may be omitted. Continuing with describing this example, second encoder 160 may in some cases be adapted to necessarily generate identifier(s) for second PPS(s), distinct from the identifier(s) of the first PPS(s), and to necessarily generate second slice(s) correctly referring to such identifier(s) of the second PPS(s).

In some embodiments, the stream may be limited to one distinct SPS (e.g. an SPS included in the first NAL units), and therefore both the first PPS(s) and the second PPS(s) refer to the same SPS identifier. One distinct SPS may be used, for instance, if non-block (e.g. non-macroblock) adaptive frame field video is encoded in the first encoding, and/or if the second encoding supports encoding of block (e.g. macroblock) adaptive frame field video. If any of the first or second PPS(s) do not refer to the correct SPS identifier (that is the identifier of the distinct SPS), the PPS may be set to refer to the correct SPS identifier. For example, if the seq_parameter_set_id syntax element of a given PPS, after the first or second encoding, does not refer to the correct SPS identifier, then the syntax element may be set to refer to the correct SPS identifier, e.g. during the stitching of stage 230.

Figure 4A:
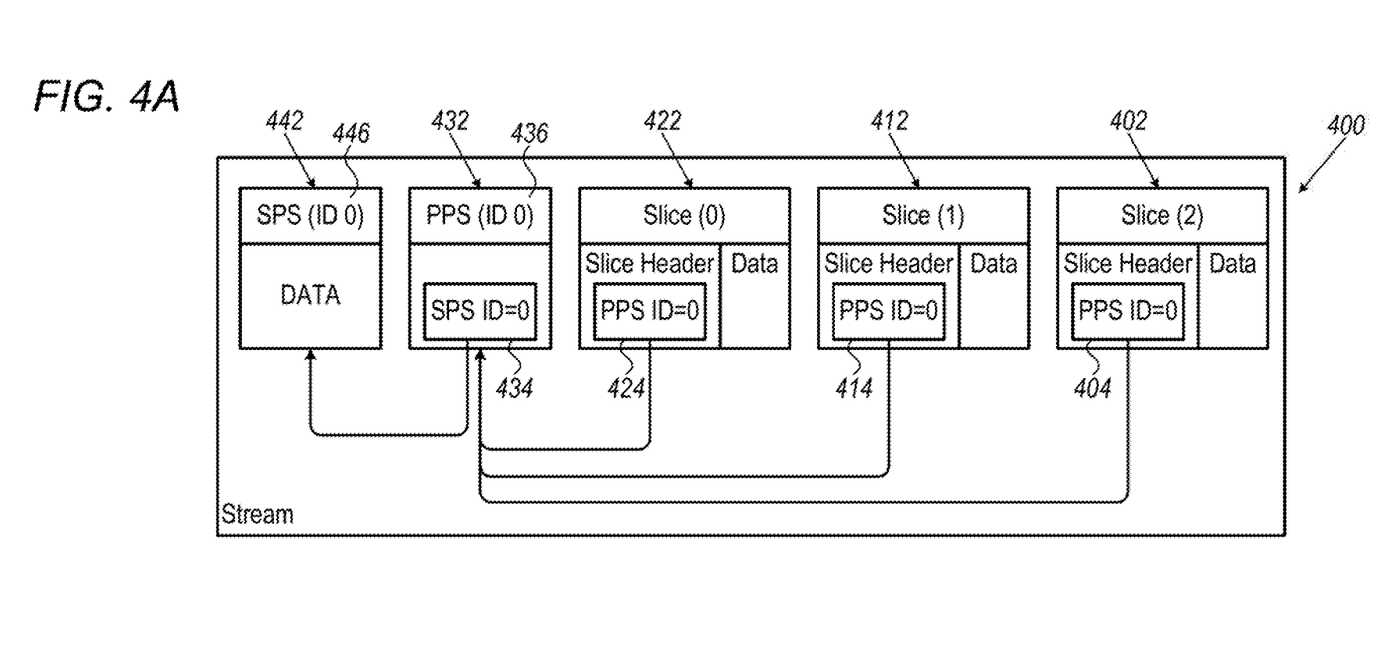
FIGS. 4A and 4B are schematic illustrations of referral examples, in accordance with some embodiments of the presently disclosed subject matter.
Figure 4B:
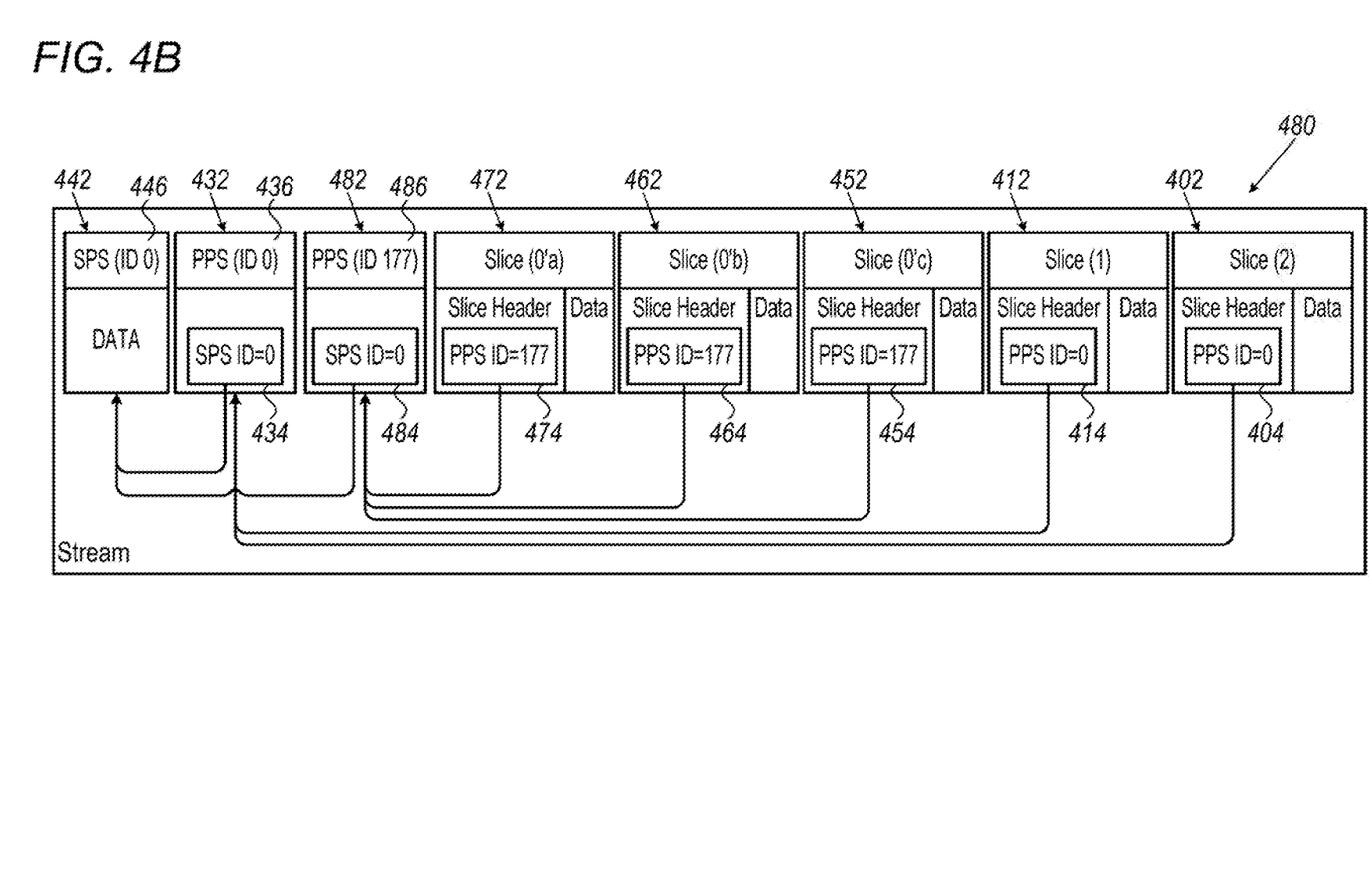

Reference is now made to FIGS. 4A and 4B which are schematic illustrations of referral examples, in accordance with various embodiments of the presently disclosed subject matter.

FIG. 4A shows five NAL units in a stream 400, prior to extraction of the temporary slice(s). Three of the NAL units, namely 402, 412 and 422 are slices. One NAL unit is a PPS 432 identified by a PPS identifier 436 of value 0, and one NAL unit is an SPS 442 identified by an SPS identifier 446 of value 0. The PPS identifier in slice headers 404, 414 and 424 of slices 402, 412 and 422 respectively are set to "0" and therefore refer to PPS identifier 436, identifying PPS 432. SPS identifier 434 in PPS 432 is set to "0" and therefore refers to SPS identifier 446, identifying SPS 442.

FIG. 4B shows eight NAL units in a stream 480, after stitching. Two of the NAL units are slices that were also in stream 400, namely slices 402 and 412. PPS 432 and SPS 442 which were in stream 400 are also shown in stream 480. However (temporary) slice 422 which was in stream 400 is replaced in stream 480 by three slices 452, 462 and 472, e.g. each destined for a different client device (such as client device 130A and two other client devices). An additional PPS 482, identified by a PPS identifier 486 of value 177 that was not in stream 400 is shown in stream 480. The PPS identifier in slice headers 404 and 414 of slices 402 and 412 respectively, are set to "0" and therefore in stream 480 still refer to PPS identifier 436, identifying PPS 432. SPS identifier 434 in PPS 432 is still set to "0" in stream 480 and therefore still refers to SPS identifier 446, identifying SPS 442. However, the PPS identifier in slice headers 454, 464 and 474 of slices 452, 462 and 472 respectively is set to "177" and therefore refers to PPS identifier 486, identifying PPS 482. SPS identifier 484 in PPS 482 is set to "0" and therefore also refers to SPS identifier 446, identifying SPS 442.

In some embodiments, the number and/or order of the NAL units in stream 400 or 480 may be different than illustrated in FIGS. 4A and 4B respectively.

Continuing with the description of method 200 (FIG. 2), in stage 270 for each second slice, one or more syntax elements of the slice header syntax of the second slice, and one or more syntax elements of the NAL unit syntax of the second slice are adapted to conform to value(s) of the temporary slice formerly occupying the position of the second slice. By conforming the syntax elements to the values, the syntax elements may be conformed to the role and/or position of the second slice in the stream.

The role of a particular second slice in the stream may include any appropriate role. For example the role may include whether or not the particular second slice is to be used for inter-prediction in the decoding of other slice(s) in the stream. In this example, if the particular second slice is to be used for inter-prediction, then the role may further include how the particular second slice is to be used for inter-prediction, the desired results of the inter-prediction, etc. The position of a particular second slice may include any suitable position which enables the correct decoding of the stream. As the particular second slice is positioned in a position formerly occupied by a specific temporary slice, effectively replacing the specific temporary slice, the role and/or position of the second slice in the stream typically although not necessarily corresponds to the role and/or position that the specific temporary slice had in the stream. If there is a plurality of particular second slices that will be positioned in the position formerly occupied by the specific temporary slice (e.g. due to a plurality of modified versions—see above description of stage 320 of FIG. 3), the plurality of particular second slices may be positioned in the stream in the position formerly occupied by the specific temporary slice (e.g. at a duplication point), effectively replacing the temporary slice. Referring again to FIGS. 4A, 4B and 4C, the slices 452, 462 and 472 in stream 480 effectively replace slice 422 of stream 400.

The conforming of syntax elements of a given second slice to the values of a given temporary slice may be performed in any suitable manner. For instance, regardless of whether or not decoding and modification are performed (e.g. as per method 300 of FIG. 3), upon extraction of the given temporary slice (e.g. by extractor 152), at least the values of the temporary slice(s) that are to be used during stage 270 may be retained. Additionally or alternatively, such values of the given temporary given slice may be replicable. In order to perform the conforming in stage 270, value(s) of certain syntax element(s) of the given temporary slice may be copied, for instance, to corresponding syntax element(s) of the given second slice; value(s) of certain syntax element(s) of the given temporary slice may be copied, for instance, to different syntax element(s) of the given second slice; and/or value(s) of certain syntax element(s) of the given temporary slice may be used, for instance, in calculating value(s) for corresponding and/or different syntax element(s) of the given second slice.

The determination of which syntax elements to conform may be made based on one or more suitable criteria. For example, such criteria may include that a particular syntax element of a given second slice is to be used during the decoding of other slice(s) (e.g. first slice(s) and/or other second slice(s)) in the stream for locating, identifying and/or interacting with the given second slice. In this example, syntax elements of a given second slice which are to be used to locate, identify and/or interact with the given second slice, in the decoding of other slices, may be adapted to conform to value(s) of the given temporary slice. There may be many complex mechanisms for managing inter-prediction and frame buffers, and such mechanisms may potentially fail without correct identification and/or location of the second slice(s). For another example, suitable criteria may be different from criteria used to determine which syntax element(s) to retain as per the second encoding (see below description of stage 280). In this example, syntax element(s) that are not characterized by the criteria for retaining as per the second encoding may be conformed in stage 270.

Section 7.3.1 of the H.264 video standard describes the NAL unit syntax. At least the following syntax elements of the second slice(s) may be adapted to conform to values of the temporary slice(s): nal_ref_idc and nal_unit_type. For example, the values of nal_ref_idc and nal_unit_type syntax elements in the temporary slice(s) formerly occupying the respective position(s) may be copied to the nal_ref_idc and nal_unit_type syntax elements in the second slice(s) currently occupying the respective position(s). It is noted that by copying the nal_unit_type, the IdrPicFlag of second slice(s) (see below) which depends on the nal_unit_type is assured of having the same value(s) as the IdrPicFlag of the temporary slice(s) formerly occupying the respective position(s). It is further noted that it may be desirable to verify that the value of syntax element forbidden_zero_bit is zero.

Section 7.3.3 of the H.264 video standard describes the slice header syntax. At least the following syntax elements of each of the second slice(s) may be adapted to conform to the values of the temporary slice formerly at the position of the second slice: slice_type, frame_num, field_pic_flag, pic_order_cnt_lsb and delta_pic_order_cnt_bottom. It is noted that it may be desirable to verify that field_pic_flag for a particular second slice has taken on the same value as the bottom_field_pic_order_in_frame_present_flag syntax element of the (second) PPS associated with the particular second slice and the frame_mbs_only_flag syntax element of the SPS associated with the particular second slice. The following syntax elements of each of the second slice(s), if present in the second slice, may be adapted to conform to the values of the temporary slice formerly at the position of the second slice: bottom_field_flag, idr_pic_id, delta_pic_order_cnt[0], delta_pic_order_cnt[1] and redundant_pic_cnt. For example, if the redundant_pic_cnt_present_field (in a second PPS) is zero, then redundant_pic_cnt is not expected to be present in a second slice associated with the second PPS. It may be desirable, for example, to verify that the value of syntax element idr_pic_id, if present, is identical to the value of IdrPicFlag, where the value of IdrPicFlag is dependent on the value of the NAL_unit_type syntax element discussed above. It may further be desirable to verify that the value of the bottom_field_flag, if present for a particular second slice, is identical to the value of the following syntax elements: field_pic_flag, bottom_field_pic_order_in_frame_present_flag of the (second) PPS associated with the particular second slice and frame_mbs_only_flag of the SPS associated with the particular second slice.

Conforming the above syntax elements of each of the second slice(s) to the values of the temporary slice formerly at the position of the second slice may include the following. For field_pic_flag and frame_num, the values may be copied from the corresponding syntax elements of the temporary slice to the second slice. For any of: bottom_field_flag, idr_pic_id, delta_pic_order_cnt[0], delta_pic_order_cnt[1] and redundant_pic_cnt the value(s) may be copied from corresponding syntax element(s), provided the syntax element(s) were present in the temporary slice. For example, delta_pic_order_cnt[0] may be present in a given temporary slice when pic_order_cnt_type (in the SPS associated with the given temporary slice) equals 1. For pic_order_cnt_lsb, if the temporary slice is a coded frame then the value may be copied from the corresponding syntax element of the temporary slice to the second slice, but if the temporary slice is a coded field, then the value may be copied from the corresponding syntax element of the top field of the temporary slice to the second slice. For delta_pic_order_cnt_bottom, if the temporary slice is a coded frame then the value may be copied from the corresponding syntax element of the temporary slice, provided the value appears there, to the second slice; but if the temporary slice is a coded field, then the value of delta_pic_order_cnt_bottom of the second slice may be calculated by subtracting the value of the pic_order_cnt_lsb of the top field of the temporary slice from the value of the pic_order_cnt_lsb of the bottom field of the temporary slice.

If a particular second slice is an SP or SI slice, then the syntax element slice_qs_delta may also be conformed to value(s) of the temporary slice formerly occupying the position of the particular second slice, for example by copying the value of the corresponding syntax element of the temporary slice to the particular second slice.

If the syntax element nal_ref_idc (of the NAL unit syntax) does not equal zero for a given second slice, then all of the syntax elements in the decoded reference picture marking syntax (section 7.3.3.3 of the H.264 video standard) may also be conformed to value(s) of the temporary slice formerly occupying the position of the given second slice, for example by copying the values of corresponding syntax elements from the temporary slice to the given second slice.

It is noted that one or more of the syntax elements of the H.264 video standard referred to in stage 270 may not need to be conformed in some embodiments. For example, if second encoder 160 is adapted to generate in the second encoding certain of the syntax element(s) of a given second slice already conformed to value(s) of the temporary slice that formerly occupied the position, then such syntax element(s) need not be conformed in stage 270.

In stage 280 for each second slice, one or more other syntax elements of the slice header of the second slice (meaning one or more syntax elements which were not conformed in stage 270) are retained as encoded in the second encoding.

The determination of which syntax element(s) in the slice header of a second slice to retain as encoded in the second encoding may be made based on one or more suitable criteria. For example, suitable criteria may include whether or not a given slice header syntax element of a particular second slice impacts on the slice data of the particular second slice. For example, a given slice header syntax element which has no impact on the slice data may not need to be retained. On the other hand, a given slice header syntax element which impacts on the slice data may be retained as encoded in the second encoding. Slice header syntax element(s) which impact on the slice data may, for instance, have one or more of the following characteristics: syntax element(s) in the slice header which affect the manner in which slice data is encoded beneath the CABAC layer; syntax element(s) in the slice header which determine whether or not various optional syntax elements are included in the slice data; syntax element(s) in the slice header that interact directly or indirectly with the slice data, with optional syntax element(s) of the slice data and/or with values of the optional syntax element(s) of the slice data; etc. It is noted that if the values of such syntax element(s) in the slice header of a particular second slice are modified from the values generated in the second encoding (e.g. in order to conform to the value(s) of the temporary slice formerly occupying the position of the particular second slice in the stream), then there may be a mismatch between the slice header and the slice data, resulting in an illegal (meaning erroneous) stream. In another example, suitable criteria may be different from criteria for conforming (see for instance above description of stage 270). In this example, syntax element(s) that are not characterized by the criteria for conforming may be retained as per the second encoding.

For instance, at least the following syntax element of second slice headers, in accordance with section 7.3.3 of the H.264 video standard, may be retained as encoded in the second encoding: slice_qp_delta. In some cases, the second encoding may have ensured that the resulting slice_qp_delta is appropriate. For example, if the second slice is derived from a temporary slice, it may be appropriate that the slice_qp_delta be approximately equal to the slice_qp_delta for the temporary slice. Additionally in this example, the following syntax element(s), if present in the slice header may be retained as encoded in the second encoding: disable_deblocking_filter_idc, slice_alpha_c0_offset_div2 and slice_beta_offset_div2.

It is noted that such syntax element(s) of a given second slice may be retained as encoded during the second encoding, regardless of whether the value(s) are the same as or different from the temporary slice that formerly occupied the position of the given second slice in the stream.

In some embodiments, certain syntax elements of the slice header may not be relevant for second slice(s), or may be irrelevant for particular second slice(s) depending on factor(s) such as whether or not reslicing has occurred, type of second slice, profile, etc. Irrelevant syntax element(s) may be ignored in the stitching of stage 230 (e.g. during stages 270 and 280). For example for the H.264 video standard, the following syntax elements in the slice header (listed in section 7.3.3.) may be expected to not be relevant for any second slice: colour_plane_flag. The following syntax elements in the slice header may be irrelevant for a second slice that is an I-frame or part of an I-frame: direct_spatial_mv_pred_flag, pred_weight_table( ), num_ref_idx_active_override_flag, num_ref_idx_l1_active_minus1, ref_pic_list_modifications( ), dec_ref_pic_marking( ), cabac_init_idc and sp_for_switch_flag. The syntax element slice group change cycle may be irrelevant for a second slice for certain profiles such as Main and High. The syntax element first_mb_in_slice may be irrelevant for a second slice if no reslicing of an original complete slice occurred in order to derive the second slice. If reslicing of an original complete slice occurred while extracting the temporary slice, the value of first_mb_in_slice may be set according to the desired placement of the second slice among the other slice(s) from the original complete slice (e.g. desired placement in a frame).

In embodiments where the first and second encodings implemented the H.265 video standard, appropriate syntax elements in the slice header and NAL unit syntax of a given second slice may be conformed to value(s) of the temporary slice that previously occupied the position of the given second slice in the stream, and other appropriate slice header syntax element(s) may be retained as encoded in the second encoding. The determination of which syntax elements to conform and which syntax elements to retain as encoded in the second encoding may be made based on any suitable criteria, such as the criteria described above with reference to stages 270 and 280. Additionally or alternatively, certain syntax element(s) in accordance with the H.265 video standard may not be relevant or may be irrelevant depending on factor(s). Such syntax element(s) may be ignored in the stitching.

In some embodiments, fewer, more and/or different syntax elements of the H.264 video standard may be conformed in stage 270, than discussed above. Additionally or alternatively, fewer more and/or different syntax elements of the H.264 video standard may be retained in stage 280 as encoded than discussed above. Additionally or alternatively, fewer more and/or different syntax elements of the H.264 video standard may not be relevant or may be irrelevant depending on factor(s) than discussed above.

As illustrated in FIG. 2, method 200 ends after stage 280. In some embodiments, method 200 may include, fewer, more and/or different stages than illustrated in FIG. 2. Any two or more stages illustrated in FIG. 2 may in some embodiments be performed in a different order than shown, and/or may be performed simultaneously rather than consecutively. For instance, two or more of stages 240, 250/260, 270 and 280 may be performed in a different order than shown and/or simultaneously. Stages 210 and 220 may be performed in a different order or simultaneously.

After the stitching (e.g. of stage 230 of method 200), the stream may be decoded by decoder 180 of the client device (e.g.130A or 130B). In some embodiments, after the stitching and prior to the decoding, the stream may undergo encrypting by encryptor 122, decrypting by decryptor 124 and/or transfer via network 120, etc. Additionally or alternatively, the stream and/or second NAL units may have undergone, prior to the stitching, encrypting by encryptor 122, decrypting by decryptor 124 and/or transfer via network 120, etc. (e.g. before being obtained in method 200 and/or during method 200). Other processing, not described herein, may additionally or alternatively be performed before, during, and/or after the stitching, as long as the processing does not cause non-trivial decoding errors.

Each of the elements described herein such as encoder 140, encoder 160, stitcher 170, decoder 180, extractor 152, decoder 154 (when included), modifier 156 (when included), encryptor 122 (when included) and/or decryptor 124 (when included), etc. may be implemented in hardware and/or software that is appropriate for performing the functions attributed to the element herein. Functions attributed herein to a particular element may in some embodiments be performed additionally or alternatively by other element(s), and the hardware and/or software of the various elements may be adjusted accordingly. Software may include firmware, when appropriate. For efficient processing, integrated circuit(s) such as application-specific integrated circuit(s) (ASIC(s)), field programmable gate array(s) (FPGA(s)), full-custom integrated circuit(s), etc. or a combination of such integrated circuits, may for example, implement one or more of the elements of system 100A/100B discussed herein such as encoder 140, encoder 160, stitcher 170, decoder 180, extractor 152, decoder 154 (when included), modifier 156 (when included), encryptor 122 (when included) and/or decryptor 124 (when included), etc. Alternatively or additionally, programmable processor(s) (referred to for short as "processor(s)"), such as graphics processing unit(s) (GPU(s)), digital signal processor(s) (DSP(s)) and/or central processing units (CPU(s)), under the control of suitable software that is in one or more computer readable media, may implement one or more of: encoder 140, encoder 160, stitcher 170, decoder 180, extractor 152, decoder 154 (when included), modifier 156 (when included), encryptor 122 (when included) and/or decryptor 124 (when included), etc. In some cases integrated circuit(s) and processor(s) under the control of suitable software may each implement a part of a particular element of system 100A/system 100B discussed herein.

A computer readable medium, for example, may include any suitable medium for transferring software, e.g. if software is downloaded to the processor(s) in electronic form, over a network. Alternatively or additionally, a computer readable medium may include any suitable storage medium for storing software, such as an optical storage medium, a magnetic storage medium, or an electronic storage medium. The location of a storage medium embodying software (also referred to as program code) relative to the processor which reads the program code may vary depending on the embodiment and may include any appropriate location (e.g. in the same physical machine, otherwise local, remote, etc.)

Integrated circuit(s), processor(s), and/or storage medium/a may in some embodiments be shared among two or more elements discussed herein (e.g. any of: encoder 140, encoder 160, stitcher 170, decoder 180, extractor 152, decoder 154 (if included), modifier 156 (if included), encryptor 122 (if included), and/or decryptor 124 (if included), etc.), and/or among other element(s) that may be included in a headend, network and/or client device for functionality that is related to the subject matter and/or for functionality that is unrelated/tangential to the subject matter (e.g. conventional functionality)

In embodiments including encryption and decryption of (e.g. of the stream, second NAL units, etc.), encryptor(s)

(e.g. encryptor 122) may use any appropriate encryption methods for encrypting the stream, second NAL units, etc. and/or any other appropriate method for intending to make the stream, second NAL units, etc. unintelligible except to an intended recipient(s) thereof. Well known types of encrypting include, for example, DES (Data Encryption Standard), 3DES, and AES (Advanced Encryption Standard). Similarly, decryptor(s) (e.g. decryptor 124) may use any appropriate decryption methods to reverse the encryption.

Examples of a client device in accordance with the subject matter (e.g. 130A or 130B) include a tablet device, smartphone, desktop or portable computer, set-top box, Internet-enabled television, media center PC, or any other suitable device, such as is known in the art.

Although network 120 is referred to in the single form, network 120 may comprise one or more networks. Network 120 may be implemented using any appropriate wired and/or wireless technology for transferring, e.g. appropriate for the operation of sending by a headend such as headend 110A or 110B, and/or the operation of receiving by a client device such as client device 130A or 130B. For example, sending by headend 1110A or 110B via network 120 may include satellite transmission, terrestrial transmission, cable, over-the-top transmission, etc. A system such as system 100A or 100B may include suitable conventional element(s) for transferring via network 120, where such element(s) may vary depending on the technology of network 100. Examples of such element(s) include network interface(s), transmitter(s), receiver(s), modulator(s) and/or demodulator(s), etc. If network 120 includes a computer network (e.g. a content delivery network, etc.), cryptographic protocol(s) such as Secure Sockets Layer and/or Transport Layer Security, etc. may be implemented, when suitable. It is assumed that the stream that is inputted into decoder 180 may be properly decoded by decoder 180, e.g. due to appropriate use of various element(s) and/or protocol(s) relating to transfer via network 120. Therefore data which is received (e.g. at client device 130A, client device 130B or element(s) of network 120) may be presumed to be sufficiently identical to the data that was sent (e.g. by element(s) of network 120, headend 110A or 110B) to be referred to by the same name (e.g. as a stream, encrypted stream, etc.). In embodiments where network 120 includes element(s) such as stitcher 170, network 120 may include suitable hardware and/or software such as discussed herein for implementing the included element(s).

A system in accordance with the subject matter may include fewer, more and/or different elements than described herein for system 100A or system 100B, as long as the system includes stitcher 170. For example, in order to at least implement stitcher 170, a system in accordance with the subject matter may include at least one integrated circuit and/or at least one processor. Additionally or alternatively, a headend, network and client device in accordance with the subject matter may each include fewer, more and/or different elements than described herein for any of headend 110A, headend 110B, network 120, client device 130A or client device 130B. The functionality of any different and/or additional elements may relate to the subject matter and/or may be unrelated/tangential to the subject matter. Additionally or alternatively, functionality described herein as being performed by a certain number of different elements, may be performed in some embodiments by fewer or more elements. For instance, stitcher 170 may be combined with any of: extractor 152, decoder 154, modifier 156, and/or second encoder 156. Continuing with describing such an instance a combined stitcher/extractor element may extract temporary slice(s) from the stream and stitch the second NAL units into the stream; a combined stitcher/second encoder element may generate in a second encoding the second NAL units and stitch the second NAL units into the stream; a combined stitcher/second encoder/extractor element may extract the temporary slice(s), generate the second NAL units in a second encoding and stitch the second NAL units into the stream; a combined stitcher/second encoder/extractor/decoder/modifier element may extract the temporary slices, decode and optionally modify the temporary slices, encode in a second encoding the decoded and/or modified versions of decoded slices to yield second NAL units and stitch the second NAL units into the stream; etc. Therefore, examples of a system in accordance with the subject matter include: a headend; a client device; a network; a headend and a client device; a headend and a network; a client device and a network; a headend, client device and network; at least one integrated circuit and/or at least one processor e.g. for at least implementing functionality of stitcher 170; etc.

Terms such as "first" and "second" are used for clarity purposes and should not be construed as implying any particular order and/or any other characteristics to items so labeled. For example, second encoder 160 and first encoder 140 may be the same actual encoder. The term "stream" is used throughout the disclosure to refer to any of: a stream that includes both first NAL units and temporary slices, a stream that includes first NAL units (e.g. after extraction of the temporary slices), and/or a stream that includes first NAL units and second NAL units (e.g. after the stitching has taken place).

Although for simplicity's sake, the above description referred to each of elements 122, 124, 140, 152, 154, 156, 160, 170 and 180, in the single form, in some embodiments, there may be a plurality of any of such element(s). For example, there may be a plurality of second encoders 160 performing the second encoding. In this example, second encoders 160 may be assigned based on any one or more suitable criteria. For instance, suitable criteria may include any of the following:

round robin/random assignment of second encoders 160; assignment of second encoders 160 based on type(s) of temporary slice(s) (e.g. I-slices versus B-slices, etc.), assignment of second encoders 160 based on type(s) of modifications (e.g. watermarked slice(s), slice(s) with no modification, etc.); assignment of second encoders 160 dependent on whether or not the generated slice(s) were derived from temporary slice(s), etc.

It will be appreciated that the subject matter contemplates, for example, a computer program product comprising a computer readable medium having computer readable program code embodied therein for executing one or more methods and/or one or more parts of method(s) disclosed herein. Further contemplated, for example, are computer readable program code for executing method(s) and/or part(s) of method(s) disclosed herein; and/or a computer readable medium having computer readable program code embodied therein for executing method(s) and/or part(s) of method(s) disclosed herein.

It will additionally be appreciated that in the above description of example embodiments, numerous specific details were set forth in order to provide a thorough understanding of the subject matter. However, it will be understood by those skilled in the art that some examples of the subject matter may be practiced without these specific details. In other instances, well-known features have not been described in detail so as not to obscure the subject matter.

It will further be appreciated that various features of the subject matter which are, for clarity, described herein in the contexts of separate embodiments may also be provided in combination in a single embodiment. Conversely, various features of the subject matter which are, for brevity, described herein in the context of a single embodiment may also be provided separately or in any suitable subcombination.

It will yet further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method comprising:
    obtaining first network abstraction layer units generated in a first encoding of a stream, the first network abstraction layer units including first slices;
    obtaining second network abstraction layer units generated in a second encoding, the second network abstraction layer units including one or more second slices, wherein obtaining the second network abstraction layer units comprises:
        extracting, prior to the first encoding, one or more temporary slices extracted from one or more selected positions comprising duplication points in the stream,
        modifying the extracted one or more temporary slices to generate the one or more second slices, and
        for the one or more second slices:
            conforming at least one slice header syntax element and at least one network abstraction layer unit syntax element of a second slice to values of a temporary slice formerly occupying the position of the second slice, and
            retaining at least one other slice header syntax element of the second slice as encoded in the second encoding; and
    stitching the second network abstract layer units into the stream, wherein stitching the second network abstract layer units into the stream comprises:
        positioning the one or more second slices in one or more respective positions in the stream formerly occupied by the one or more temporary slices generated in the first encoding.

2. The method of claim 1, wherein the first encoding is performed by at least one first encoder and the second encoding is performed by at least one second encoder that is of at least one different type than the at least one first encoder, and wherein the at least one first encoder and the at least one second encoder implement a video standard.

3. The method of claim 1, wherein the first encoding and the second encoding are implemented in accordance with the H.264 video standard.

4. The method of claim 1, further comprising:
    extracting one or more of the one or more temporary slices from the stream as one or more extracted slices;
    decoding the one or more extracted slices to generate one or more decoded slices; and
    for the one or more decoded slices, encoding in the second encoding a decoded slice or at least one modified version thereof, yielding at least one of the one or more second slices.

5. The method of claim 4, further comprising:
    modifying the one or more decoded slices by performing at least one of: forensic watermarking, non-forensic watermarking, logo insertion, blurring, video downgrading, advertisements object planting, changing coloring, linear ad insertion, or pixelating.

6. The method of claim 5, wherein the modifying is performed a plurality of times on a decoded particular temporary slice that was generated by decoding a particular temporary slice, the modifying yielding a plurality of modified versions, and wherein the plurality of modified versions are encoded, yielding a plurality of particular second slices for positioning in the position in the stream formerly occupied by the particular temporary slice.

7. The method of claim 1, wherein the conforming includes: copying values of corresponding slice header and network abstraction layer unit syntax elements from the temporary slice to the at least one slice header syntax element and the at least one network abstraction layer unit syntax element of the second slice.

8. The method of claim 1, wherein at least two of the one or more temporary slices were comprised in the stream as part of at least one original complete slice in the stream, and wherein the method further comprises: extracting the at least two temporary slices from the stream, the extracting including: reslicing the at least one original complete slice into the at least two temporary slices.

9. The method of claim 1, wherein the first network abstraction layer units further include one or more first picture parameter sets and the second network abstraction layer units further include at least one second picture parameter set, the stitching further comprising:
    upon determining that at least one second identifier used to identify any of the at least one second picture parameter set is identical to at least one first identifier used to identify any of the one or more first picture parameter sets, setting the at least one second identifier to have at least one value that is different from any first identifier used to identify the one or more first picture parameter sets, and
    setting any of the one or more second slices which referred to a second identifier that was determined to be identical to any first identifier, to refer instead to the different value that was set for the second identifier.

10. The method of claim 1, wherein conformed syntax elements of the second slice are to be used in decoding of one or more other slices in the stream.

11. The method of claim 1, wherein the retained at least one other slice header syntax element of the second slice impacts on the slice data of the second slice.

12. The method of claim 1, further comprising encrypting the stream and sending the encrypted stream to a client device.

13. The method of claim 1, wherein the one or more second slices include at least one intra-slice.

14. The method of claim 1, wherein the one or more second slices each includes a single block.

15. The method of claim 1, wherein for each of the one or more second slices, an entire frame is encoded as the second slice.

16. A system comprising:
    a memory storage; and
    at least one processor coupled to the memory storage, wherein the at least one processor is adapted to:
        obtain first network abstraction layer units generated in a first encoding of a stream, the first network abstraction layer units including first slices;
        obtain second network abstraction layer units generated in a second encoding of the stream, the second network abstraction layer units including one or more second slices, wherein the at least one processor being adapted to obtain the second network abstraction layer units comprises the at least one processor being adapted to:
  extract, prior to the first encoding, one or more temporary slices extracted from one or more selected positions comprising duplication points in the stream,
  modify the extracted one or more temporary slices to generate the one or more second slices, and
  for the one or more second slices:
    conform at least one slice header syntax element and at least one network abstraction layer unit syntax element of a second slice to values of a temporary slice formerly occupying the position of the second slice, and
    retain at least one other slice header syntax element of the second slice as encoded in the second encoding; and
  stitch said second network abstract layer units into the stream, wherein the at least one processor being adapted to stitch the second network abstract layer units comprises the at least one processor being adapted to:
    position the one or more second slices in one or more respective positions in the stream formerly occupied by the one or more temporary slices generated in the first encoding.

17. The system of claim 16, wherein the system is a headend.

18. The system of claim 16, wherein the system is a client device.

19. The system of claim 16, wherein the system is the at least one integrated circuit.

20. A non-transitory computer readable medium that stores a set of instructions which when executed perform a method executed by the set of instructions comprising:
  obtaining first network abstraction layer units generated in a first encoding of a stream, the first network abstraction layer units including first slices;
  obtaining second network abstraction layer units generated in a second encoding of the stream, the second network abstraction layer units including one or more second slices, wherein obtaining the second network abstraction layer units comprises:
    extracting, prior to the first encoding, one or more temporary slices extracted from one or more selected positions comprising duplication points in the stream,
    modifying the extracted one or more temporary slices to generate the one or more second slices, and
    conforming, for the one or more second slices, at least one slice header syntax element and at least one network abstraction layer unit syntax element of a second slice to values of a temporary slice formerly occupying the position of the second slice, and
    retaining, for each of the one or more second slices, at least one other slice header syntax element of the second slice as encoded in the second encoding; and
  stitching second network abstract layer units into the stream, wherein stitching the second network abstract layer units into the stream comprises:
    positioning the one or more second slices in one or more respective positions in the stream formerly occupied by the one or more temporary slices generated in the first encoding.

* * * * *